United States Patent
Betker et al.

(10) Patent No.: US 7,168,067 B2
(45) Date of Patent: Jan. 23, 2007

(54) MULTIPROCESSOR SYSTEM WITH CACHE-BASED SOFTWARE BREAKPOINTS

(75) Inventors: Michael Richard Betker, Allentown, PA (US); Han Q. Nguyen, Allentown, PA (US); Bryan Schlieder, Bethlehem, PA (US); Shaun Patrick Whalen, Wescosville, PA (US); Jay Patrick Wilshire, Pennsburg, PA (US)

(73) Assignee: Agere Systems Inc., Allentown, PA (US)

( * ) Notice: Subject to any disclaimer, the term of this patent is extended or adjusted under 35 U.S.C. 154(b) by 701 days.

(21) Appl. No.: 10/072,529

(22) Filed: Feb. 8, 2002

(65) Prior Publication Data

US 2003/0154463 A1 Aug. 14, 2003

(51) Int. Cl.
  *G06F 9/44* (2006.01)
  *G06F 9/45* (2006.01)
(52) U.S. Cl. ............... 717/129; 717/124; 717/130; 717/136
(58) Field of Classification Search ........ 717/124–130, 717/174, 204, 105; 714/30, 35; 712/204, 712/227, 210; 711/118; 710/262; 718/100
See application file for complete search history.

(56) References Cited

U.S. PATENT DOCUMENTS

| 5,548,717 | A | * | 8/1996 | Wooldridge et al. ........ 717/124 |
| 5,797,019 | A | * | 8/1998 | Levine et al. ............... 710/262 |
| 5,809,273 | A | * | 9/1998 | Favor et al. ................. 712/210 |
| 5,819,056 | A | * | 10/1998 | Favor .......................... 712/204 |
| 5,850,562 | A | * | 12/1998 | Crump et al. .................. 713/1 |
| 5,859,991 | A | * | 1/1999 | Narayan ..................... 712/204 |
| 5,970,241 | A | * | 10/1999 | Deao et al. ................. 712/227 |
| 6,016,555 | A | * | 1/2000 | Deao et al. .................. 714/35 |
| 6,142,683 | A | * | 11/2000 | Madduri ..................... 717/128 |
| 6,189,140 | B1 | * | 2/2001 | Madduri ..................... 717/128 |
| 6,425,122 | B1 | * | 7/2002 | Klingman ................... 717/124 |
| 6,493,868 | B1 | * | 12/2002 | DaSilva et al. ............. 717/105 |
| 6,543,049 | B1 | * | 4/2003 | Bates et al. ................. 717/129 |
| 6,615,368 | B1 | * | 9/2003 | Dunlap ........................ 714/30 |

(Continued)

OTHER PUBLICATIONS

Haban et al., Global events and global breakpoints in distributed systems, IEEE, vol. 2 Jan. 5-8, 1988, pp. 166-175.*

(Continued)

*Primary Examiner*—Wei Zhen
*Assistant Examiner*—Satish S. Rampuria

(57) ABSTRACT

Techniques are disclosed for implementing software breakpoints in a multiprocessor system having a number of processors each coupled to a main memory. In an illustrative embodiment, each of the processors has an instruction cache associated therewith. An instruction for which a breakpoint is to be inserted is retrieved from a corresponding instruction address in the main memory, and a breakpoint code is inserted at the instruction address in main memory. After the breakpoint code is executed by a given one of the processors, the retrieved instruction is stored in the corresponding instruction cache for that processor, and a use-once indicator is set. The use-once indicator is operative via cache control logic to clear a validity indicator associated with the instruction after a single fetch of the instruction from the instruction cache, such that subsequent attempts by the given processor to access the instruction as stored in the instruction cache will cause the processor to retrieve the breakpoint code at the instruction address in main memory.

12 Claims, 5 Drawing Sheets

U.S. PATENT DOCUMENTS

| | | | |
|---|---|---|---|
| 6,848,097 B1* | 1/2005 | Alverson et al. | 717/124 |
| 6,922,795 B2* | 7/2005 | Miyayama et al. | 714/34 |
| 6,941,545 B1* | 9/2005 | Reese et al. | 717/130 |
| 2002/0100024 A1* | 7/2002 | Hunter et al. | 717/129 |
| 2003/0217227 A1* | 11/2003 | Parthasarathy et al. | 711/118 |
| 2004/0187117 A1* | 9/2004 | Orion et al. | 718/100 |
| 2004/0193957 A1* | 9/2004 | Swoboda et al. | 714/30 |
| 2004/0205747 A1* | 10/2004 | Bernstein et al. | 717/174 |
| 2005/0086650 A1* | 4/2005 | Yates et al. | 717/139 |

OTHER PUBLICATIONS

Miller et al., Breakpoints and halting in distributed programs, IEEE, Jun. 13-17, 1988, pp. 316-323.*

Manabe et al., Debugging dynamic distributed programs using global predicates, IEEE, Dec. 1-4, 1992, pp. 402-407.*

Tucker et al., Compiler optimization and its impact on development of real-time systems, IEEE, vol. 1 Oct. 31-Nov. 7, 1998 pp. C12/1-C12/6.*

* cited by examiner

```
P0 state: NONDEBUG
P0 cache[index(swbpt)]  V state: 0
P0 cache[index(swbpt)]  U state: 0
P0 cache[index(swbpt)]  Tag state: x
P0 cache[index(swbpt)]  Data state: x
P1 state: NONDEBUG
P1 cache[index(swbpt)]  V state: 0
P1 cache[index(swbpt)]  U state: 0
P1 cache[index(swbpt)]  Tag state: x
P1 cache[index(swbpt)]  Data state: x
P2 state: NONDEBUG
P2 cache[index(swbpt)]  V state: 0
P2 cache[index(swbpt)]  U state: 0
P2 cache[index(swbpt)]  Tag state: x
P2 cache[index(swbpt)]  Data state: x
```

(b)

```
P0 state: NONDEBUG
P0 cache[index(swbpt)]  V state: 1
P0 cache[index(swbpt)]  U state: 0
P0 cache[index(swbpt)]  Tag state: tag(swbpt)
P0 cache[index(swbpt)]  Data state: DEBUG
P1 state: NONDEBUG
P1 cache[index(swbpt)]  V state: 0
P1 cache[index(swbpt)]  U state: 0
P1 cache[index(swbpt)]  Tag state: x
P1 cache[index(swbpt)]  Data state: x
P2 state: NONDEBUG
P2 cache[index(swbpt)]  V state: 0
P2 cache[index(swbpt)]  U state: 0
P2 cache[index(swbpt)]  Tag state: x
P2 cache[index(swbpt)]  Data state: x
```

(c)

```
P0 state: DEBUG
P0 cache[index(swbpt)]  V state: 1
P0 cache[index(swbpt)]  U state: 0
P0 cache[index(swbpt)]  Tag state: tag(swbpt)
P0 cache[index(swbpt)]  Data state: DEBUG
P1 state: NONDEBUG
P1 cache[index(swbpt)]  V state: 0
P1 cache[index(swbpt)]  U state: 0
P1 cache[index(swbpt)]  Tag state: x
P1 cache[index(swbpt)]  Data state: x
P2 state: NONDEBUG
P2 cache[index(swbpt)]  V state: 0
P2 cache[index(swbpt)]  U state: 0
P2 cache[index(swbpt)]  Tag state: x
P2 cache[index(swbpt)]  Data state: x
```

(d)

```
P0 state: NONDEBUG
P0 cache[index(swbpt)]  V state: 1
P0 cache[index(swbpt)]  U state: 1
P0 cache[index(swbpt)]  Tag state: tag(swbpt)
P0 cache[index(swbpt)]  Data state: bpopcode
P1 state: NONDEBUG
P1 cache[index(swbpt)]  V state: 0
P1 cache[index(swbpt)]  U state: 0
P1 cache[index(swbpt)]  Tag state: x
P1 cache[index(swbpt)]  Data state: x
P2 state: NONDEBUG
P2 cache[index(swbpt)]  V state: 1
P2 cache[index(swbpt)]  U state: 0
P2 cache[index(swbpt)]  Tag state: tag(swbpt)
P2 cache[index(swbpt)]  Data state: DEBUG
```

```
P0 state: NONDEBUG
P0 cache[index(swbpt)]  V state: 0
P0 cache[index(swbpt)]  U state: 0
P0 cache[index(swbpt)]  Tag state: x
P0 cache[index(swbpt)]  Data state: x
P1 state: NONDEBUG
P1 cache[index(swbpt)]  V state: 0
P1 cache[index(swbpt)]  U state: 0
P1 cache[index(swbpt)]  Tag state: x
P1 cache[index(swbpt)]  Data state: x
P2 state: DEBUG
P2 cache[index(swbpt)]  V state: 1
P2 cache[index(swbpt)]  U state: 0
P2 cache[index(swbpt)]  Tag state: tag(swbpt)
P2 cache[index(swbpt)]  Data state: DEBUG
```

(f)

```
P0 state: NONDEBUG
P0 cache[index(swbpt)]  V state: 0
P0 cache[index(swbpt)]  U state: 0
P0 cache[index(swbpt)]  Tag state: x
P0 cache[index(swbpt)]  Data state: x
P1 state: NONDEBUG
P1 cache[index(swbpt)]  V state: 0
P1 cache[index(swbpt)]  U state: 0
P1 cache[index(swbpt)]  Tag state: x
P1 cache[index(swbpt)]  Data state: x
P2 state: NONDEBUG
P2 cache[index(swbpt)]  V state: 1
P2 cache[index(swbpt)]  U state: 1
P2 cache[index(swbpt)]  Tag state: tag(swbpt)
P2 cache[index(swbpt)]  Data state: bpopcode
```

(g)

```
P0 state: NONDEBUG
P0 cache[index(swbpt)]  V state: 0
P0 cache[index(swbpt)]  U state: 0
P0 cache[index(swbpt)]  Tag state: x
P0 cache[index(swbpt)]  Data state: x
P1 state: NONDEBUG
P1 cache[index(swbpt)]  V state: 0
P1 cache[index(swbpt)]  U state: 0
P1 cache[index(swbpt)]  Tag state: x
P1 cache[index(swbpt)]  Data state: x
P2 state: NONDEBUG
P2 cache[index(swbpt)]  V state: 0
P2 cache[index(swbpt)]  U state: 0
P2 cache[index(swbpt)]  Tag state: x
P2 cache[index(swbpt)]  Data state: x
```

MULTIPROCESSOR SYSTEM WITH CACHE-BASED SOFTWARE BREAKPOINTS

FIELD OF THE INVENTION

The present invention relates generally to multiprocessor integrated circuits and other types of systems which include multiple processors, and more particularly to techniques for implementing software breakpoints in such systems.

BACKGROUND OF THE INVENTION

Software breakpoints are typically implemented as assembly instructions embedded in a program. A given one of these assembly instructions when encountered in the program causes execution of the program to transfer to a debugger. As is well known, the use of designated breakpoints in conjunction with the debugger allows a programmer to inspect the state of the program in order to fix a problem or better understand program behavior.

In the case of a single conventional processor, a software breakpoint may be embedded in a program by overwriting an existing instruction at the desired breakpoint location with an assembly instruction in the form of a specified debug operation code, also referred to as an opcode. The overwritten instruction is stored by the debugger so that it may subsequently replace the inserted opcode upon resumption of normal operation, as will be described below. Examples of conventional debug opcodes include opcodes referred to as DEBUG, TRAP, etc. These debug opcodes generally vary depending on the processor.

After a given breakpoint is taken and the programmer is ready to continue with normal execution of the program, a two step process typically takes place. First, the debugger replaces the debug opcode with the previously-overwritten existing instruction, so that this instruction alone may be executed (or "stepped"). Then the debug opcode is restored at the desired breakpoint location so that the next time program execution reaches this point, another breakpoint will occur.

Many high performance processors include an instruction cache. An instruction cache enables the processor to store frequently accessed instructions in a fast local memory that adapts its contents to the executing program.

A multiprocessor system generally includes multiple processors each connected to a common bus. Also connected to the common bus is a shared main memory that stores instructions and data for use by the processors. In such a system, each of the processors will typically have its own instruction cache. These instruction caches are particularly important in multiprocessor systems in that the caches serve to significantly reduce the bus traffic associated with the instruction and data fetches of the multiple processors.

The conventional single-processor software breakpoints described above generally do not work in a multiprocessor system. More particularly, in a multiprocessor system, once a particular one of the processors has taken a software breakpoint, the corresponding actual instruction must be written to the shared memory so the stopped processor can subsequently fetch and execute it. However, while the actual instruction is in shared memory, the other processors may fetch and execute it, thus missing the breakpoint. Thus, in a shared-memory multiprocessor system, the programmer utilizing conventional single-processor software breakpoint techniques would be likely to observe erratic behavior, e.g., sometimes a given processor would stop at a software breakpoint and other times it would not.

Examples of known multiprocessor systems include the DSP16410 and DSP16270 shared-memory multiprocessor digital signal processors (DSPs) available from Agere Systems Inc. of Allentown, Pa. USA. Each of these systems includes two processors, denoted DSP0 and DSP1. These processors do not have instruction caches, but can execute from a common shared memory. Consider a case where a software breakpoint has been set in the shared memory and executed by DSP0. In order to resume normal execution after the breakpoint is taken, the actual instruction code at the breakpoint location should be placed in local memory that is private to DSP0. This enables DSP0 to execute the actual instruction without preventing DSP1 from hitting the desired breakpoint. Implementing multiprocessor software breakpoints on the DSP16410 or the DSP16270 therefore may require local instruction memory, which adds to the cost of the device. In addition, rebuilding the executable code so that the breakpoint debug opcode is moved to the address space corresponding to the local memory can be inconvenient and time consuming for the programmer. These and other similar problems arise in a wide variety of other conventional multiprocessor systems.

A need therefore exists for improved techniques for implementing software breakpoints in shared-memory multiprocessor systems, so as to avoid one or more of the above-described problems.

SUMMARY OF THE INVENTION

The invention provides improved techniques for implementing software breakpoints in a shared-memory multiprocessor system.

In accordance with one aspect of the invention, a software breakpoint is implemented in a multiprocessor system having a number of processors each coupled to a main memory. Each of the processors preferably has an instruction cache associated therewith. An instruction for which a breakpoint is to be inserted is retrieved from a corresponding instruction address in the main memory, and a breakpoint code, e.g., a debug opcode, is inserted at the instruction address in main memory.

The invention may be implemented using a debugger which communicates with the multiprocessor system via an interface. The debugger saves the retrieved instruction that has been replaced with the breakpoint code, and when the breakpoint code is executed by a given one of the processors, a breakpoint is taken and the debugger takes control of the given processor. Before the debugger resumes execution, it stores the retrieved instruction in the instruction cache for the given processor, and sets a use-once indicator associated with the instruction as stored in the corresponding instruction cache for that processor.

The use-once indicator, when set for the instruction as stored in the instruction cache, is operative via cache control logic to clear a validity indicator associated with the instruction after a single fetch of the instruction from the instruction cache. As a result, subsequent attempts by the given processor to access the instruction as stored in the instruction cache will cause the processor to retrieve the breakpoint code at the instruction address in main memory.

Advantageously, the software breakpoint techniques of the present invention ensure that a specified debug opcode or other breakpoint code can remain present in the main memory of the multiprocessor system at all times, such that all of the processors of the system will reliably fetch and execute that breakpoint code even if one or more of these processors are resuming execution from the breakpoint.

BRIEF DESCRIPTION OF THE DRAWINGS

FIG. 5 is an example illustrating the operation of a three-processor implementation of a multiprocessor system in accordance with the invention.

DETAILED DESCRIPTION OF THE INVENTION

The invention will be illustrated herein in conjunction with an exemplary shared-memory multiprocessor system. It should be understood, however, that the invention is more generally applicable to any shared-memory multiprocessor system in which it is desirable to provide improved performance through the use of software breakpoints. The term "multiprocessor system" as used herein is intended to include any device in which retrieved instructions are executed using one or more processors. The term "processor" is intended to include, by way of example and without limitation, microprocessors, central processing units (CPUs), very long instruction word (VLIW) processors, single-issue processors, multi-issue processors, digital signal processors (DSPs), application-specific integrated circuits (ASICs), and other types of data processing devices, as well as portions and combinations of these and other devices.

Figure 1:
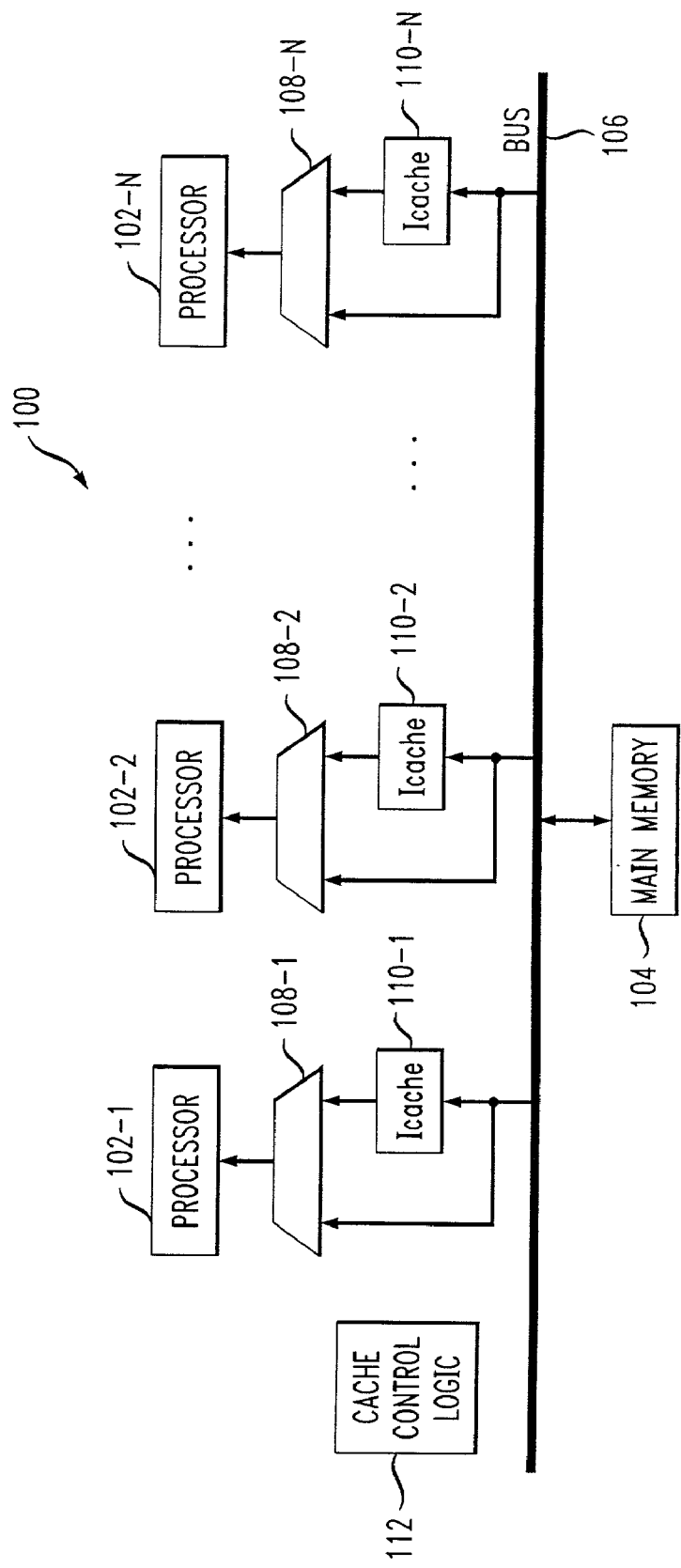
FIG. 1 is a block diagram of an example multiprocessor system in which the present invention is implemented.

FIG. 1 shows a shared-memory multiprocessor system 100 in which the present invention is implemented. The system 100 includes a number of processors 102-1, 102-2, . . . 102-N, each coupled to a main memory 104 via a common bus 106. Also associated with each of the processors 102-i, i=1, 2, . . . N, is a corresponding multiplexer 108-i and instruction cache (Icache) 110-i. In operation, the processors 102 each retrieve instructions for execution, as well as associated data, from the main memory 104. The instructions may be retrieved directly from the main memory 104 via a first path through the multiplexer 108, or from the instruction cache 110 via a second path through the multiplexer 108. The processors 102 also return instruction execution results to the main memory 104 via bus 106, although separate return paths from the processors to the bus 106 are not explicitly shown in the figure. These return paths may be combined in whole or in part with the illustrative signal lines used to retrieve the instructions and data, i.e., bidirectional signal lines may be used.

Also included in the multiprocessor system 100 is a set of cache control logic 112. Although not explicitly shown as such in the figure, the cache control logic 112 may be coupled to each of the instruction caches 110. Alternatively, the cache control logic 112 may be distributed across the instruction caches 110 such that a portion of the cache control logic 112 forms an internal portion of each of the instruction caches 110. Other arrangements may also be used, e.g., various combinations of centralized and distributed logic. The operation of the cache control logic 112 will be described in greater detail below in conjunction with the description of FIGS. 2 through 5. Suitable hardware or software elements, or various combinations thereof, may be configured in a straightforward manner to provide the cache control logic functionality described herein, as will be appreciated by those skilled in the art. The cache control logic 112 may therefore be implemented in hardware, in software, or as a combination of hardware and software.

In accordance with the present invention, the instruction caches 110 of the FIG. 1 system are configured so as to permit a debugger to place and mark an existing instruction, for which a breakpoint is to be established, in a given one of the instruction caches of a particular processor. Advantageously, the placing and marking of the instruction ensure that the other processors of the system will not miss the breakpoint when the particular processor is resumed. The illustrative embodiment of the invention implements this capability in part through the addition of a control bit, referred to herein as a use-once (U) bit, to each set of instruction information stored in the instruction cache, and by permitting the debugger to write this information directly to the instruction cache.

Figure 2:
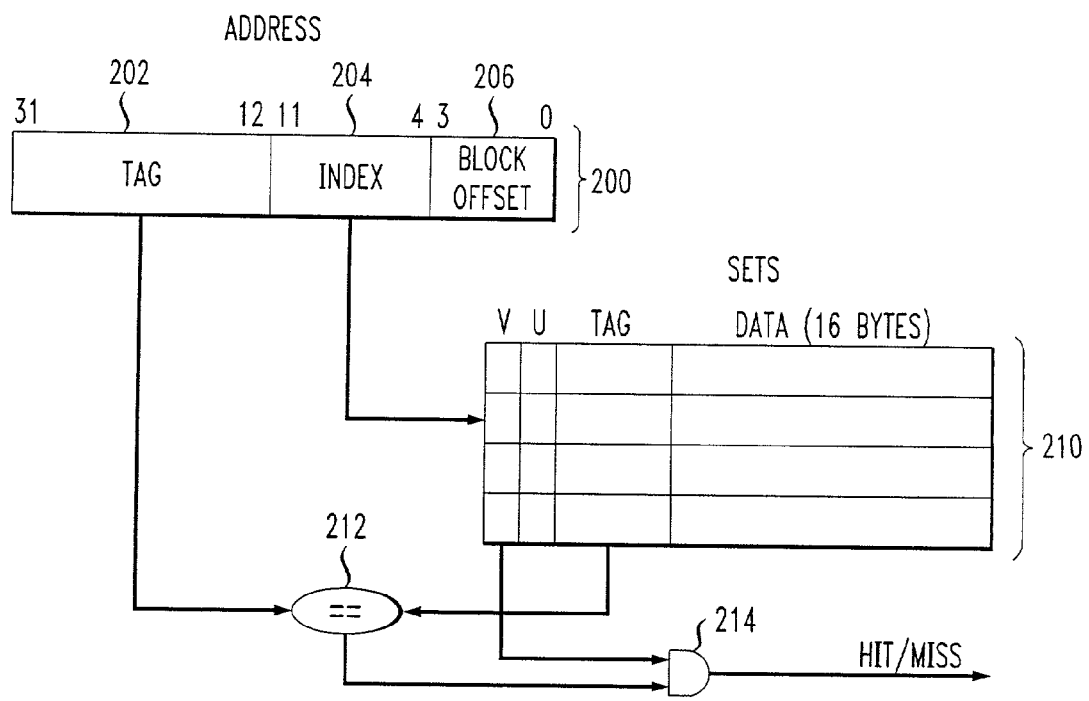
FIG. 2 illustrates the operation of an instruction cache of the FIG. 1 multiprocessor system in accordance with the invention.

FIG. 2 illustrates the instruction processing in a given one of the instruction caches 110 of the FIG. 1 system, i.e., a particular instruction cache 110-i, although it should be understood that substantially the same instruction processing is utilized in each of the instruction caches 110. In the illustrative embodiment, when the corresponding processor 102-i fetches an instruction from the instruction cache 110-i, it presents an address 200 to the cache. The address 200 as shown in FIG. 2 includes a tag field 202, an index field 204, and a block offset field 206. The address 200 in this example is a 32-bit address, with bits 0–3 corresponding to the block offset, bits 4–11 corresponding to the index, and bits 12–31 corresponding to the tag.

It should be emphasized that this particular address arrangement is by way of example only, and other address lengths and field configurations may be used. In other words, the invention does not require that the presented address have a particular format.

The index field 204 of the address 200 is used to select one of several sets in the instruction cache 110-i. More particularly, the particular value of the index field 204 specifies a particular set 210 within a group of such sets, where each of the sets corresponds generally to a set of instructions stored in the cache. Each instruction in the set 210 includes a valid (V) bit, the above-mentioned use-once (U) bit, a tag field, and the instruction data.

The instruction cache 110-i in accordance with the invention includes logic elements 212 and 214, which may be implemented in a straightforward manner well-known to those skilled in the art. As shown in the figure, logic element 212 compares the tag field 202 of the presented address 200 to the tag fields of the set 210 as selected using the index field 204, and logic element 214 performs an AND operation on the output of the logic element 212 and the valid bit. The output of logic element 214 is at a logic high level if for a given instruction in the set 210 the tag field 202 matches its tag field and its valid bit is set, i.e., at a logic high level. In this situation, the cache is said to "hit" at the instruction address 200, and otherwise to "miss" at the instruction address 200.

In normal operation absent any inserted software breakpoints, if there is a match between the tag field 202 of the address and the tag field of a given one of the instructions, and the valid bit is set for the given instruction, then the desired instruction data is in the cache 110-i and is returned to the corresponding processor 102-i. If there is no match or the valid bit is clear, the desired instruction data is not in the cache 110-i, and therefore must be fetched from the main memory 104.

As indicated above, the use-once bit is utilized to implement software breakpoints in an advantageous manner in accordance with the techniques of the invention. Such breakpoints may be inserted using an arrangement such as that shown in FIG. 3. In this particular software breakpoint processing configuration 300, a debugger 302 interacts via an interface 304 with the multiprocessor 100 of FIG. 1. The debugger 302, which may also be referred to as a debugger tool, may be implemented using appropriately-configured hardware and software elements, as is well known. The interface 304 may also be implemented in manner well understood by those skilled in the art, and is therefore not described in detail herein. It is to be appreciated that the invention does not require the use of any particular type of debugger or multiprocessor system interface. The debugger will typically run on a processor that is not an element of the system 100, but this is by way of example and not limitation.

Figure 3:
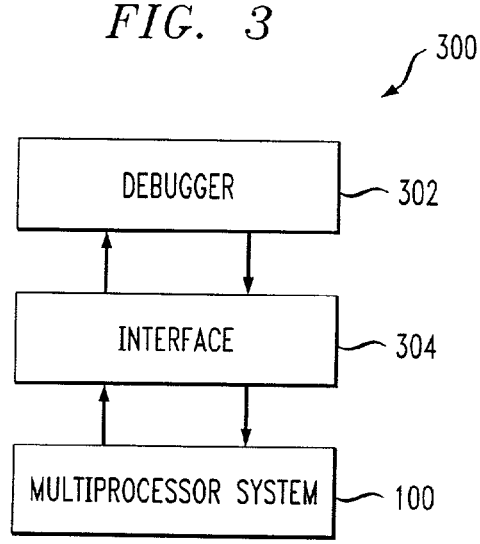
FIG. 3 illustrates the interaction of the FIG. 1 multiprocessor system with a debugger.

In order to program a software breakpoint for a given processor of the multiprocessor system 100, a programmer utilizes the debugger 302 of FIG. 3 to overwrite an existing instruction at the desired breakpoint location in main memory 104 with a specified debug opcode. However, the existing instruction to be overwritten is first fetched from main memory 104 and saved by the debugger for subsequent storage in one or more of the instruction caches 110 upon resumption of execution from a taken breakpoint, as will be described in greater detail below.

When a given processor 102-i executes the inserted debug opcode from the main memory 104, the breakpoint is said to be taken by that processor, and execution of the program is transferred to the debugger 302, e.g., via a designated exception, transition to a debug operation mode, etc. After the breakpoint is taken by processor 102-i and the programmer is ready to continue with normal execution of the program, the debugger 302 writes the instruction data portion of the appropriate element in the cache set 210 with the corresponding information from the actual instruction for which the breakpoint was taken, and sets the use-once bit for that element in the cache set 210.

The processor 102-i resumes execution of the program after the breakpoint is taken by executing a fetch request using the address of the actual instruction for which the breakpoint was taken. This fetch request is serviced from the instruction cache 110-i. However, immediately after servicing this request, and in accordance with the techniques of the invention, the set use-once bit causes the cache control logic to clear the valid bit for that element of the set 210. Thus, the next time the processor 102-i issues a fetch request for this instruction address, the cache will "miss" and the debug opcode will automatically be fetched again from main memory 104.

Advantageously, the above-described mechanism ensures that the desired debug opcode is always present in main memory 104, such that all of the processors 102 will reliably fetch and execute it even if one or more of these processors are resuming execution from the breakpoint.

It should be noted that it is common to associate attributes with instruction addresses to control the handling of the instruction fetch. For example, one known attribute is the so-called "noncacheable" attribute. This attribute indicates whether a particular instruction address should be allowed to be stored in the instruction cache. Each of the processors 102 typically includes hardware for interpreting such attributes.

For an instruction address with the noncacheable attribute, the cache control logic always treats a fetch to this address as a miss.

The above-described use-once bit, however, changes the handling of the noncacheable attribute so that a software breakpoint can be set on a noncacheable instruction. For a software breakpoint on a noncacheable instruction, a given processor 102-i fetches the breakpointed instruction, but does not put the instruction in its instruction cache. After the breakpoint is taken by processor 102-i and the programmer is ready to continue with normal execution of the program, the debugger 302 writes the instruction data portion of the appropriate element in the cache set 210 with the corresponding information from the actual noncacheable instruction for which the breakpoint was taken, and sets the use-once bit for that element in the cache set 210. The set use-once bit causes the cache control logic to fetch this instruction address from the cache even though its attribute says that it is noncacheable. Once the fetch is serviced from the cache, the valid bit of the instruction is cleared as previously described. Thus, the use-once bit mechanism of the present invention allows software breakpoints to be set on both cacheable and noncacheable instructions, and to be taken by a given processor without impacting other processors in the multiprocessor system 100.

Figure 4:
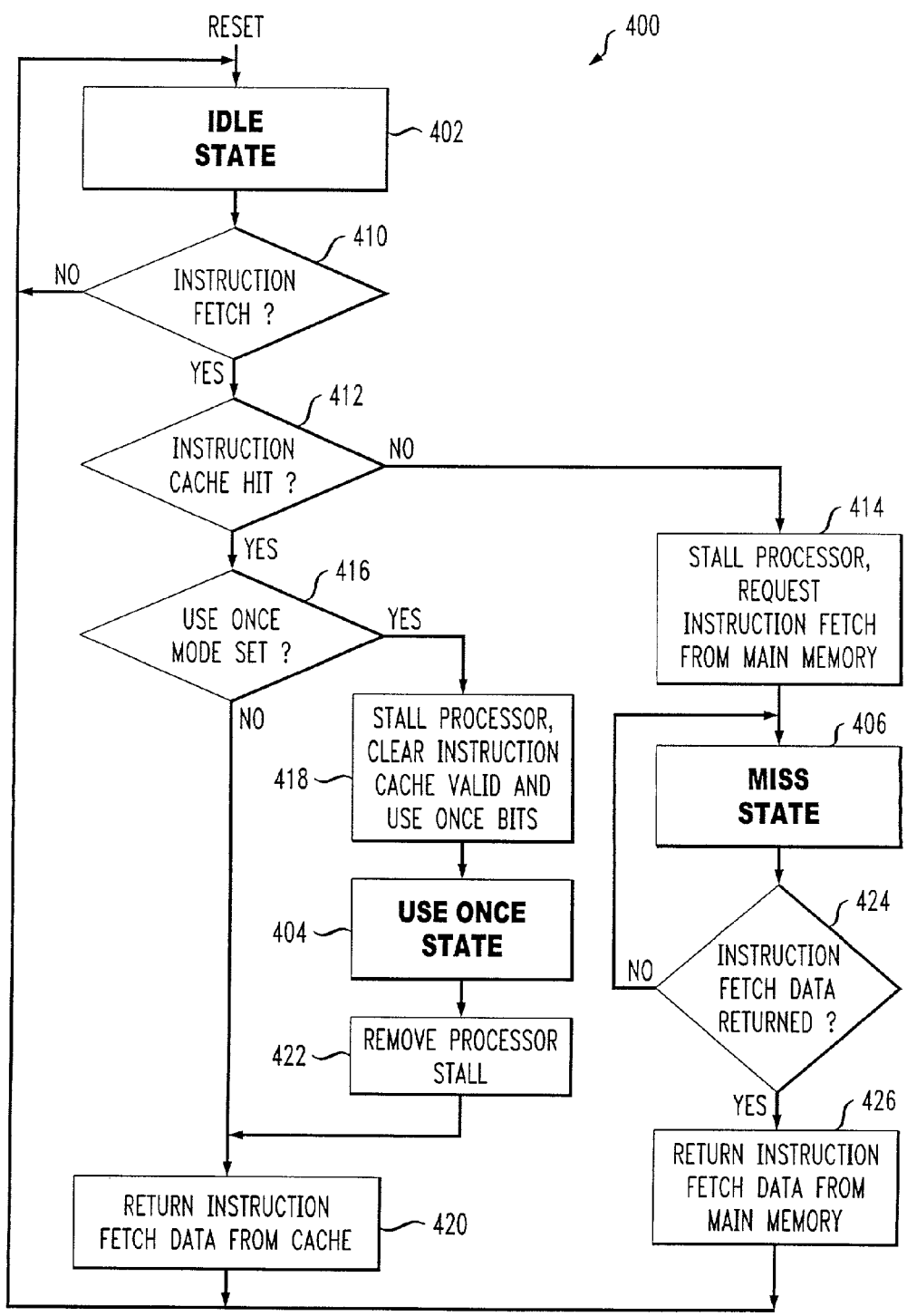
FIG. 4 shows a state and flow diagram illustrating the operation of a multiprocessor system in accordance with the invention.

FIG. 4 shows a state and flow diagram 400 which illustrates in greater detail the above-described cache-based software breakpoint process as implemented in multiprocessor system 100. The diagram 400 includes an IDLE state 402, a USE ONCE state 404, and a MISS state 406.

The system is initially in the IDLE state, e.g., upon execution of a reset command as shown. From the IDLE state, a determination is made in step 410 as to whether an instruction fetch has been requested by a given processor 102 of the system. If not, the process remains in the IDLE state. Otherwise, step 412 determines if there has been an instruction cache hit for the given processor. If there is no instruction cache hit in step 412, the given processor is stalled and the instruction request is directed to the main memory 104 of the system, as indicated in step 414, and the process then enters the MISS state. If there is an instruction cache hit in step 412, step 416 determines if the USE ONCE mode is set, i.e., determines if the use-once bit for the instruction cache is set. If the use-once bit is set, the given processor is stalled and the valid and use-once bits of the instruction cache are cleared, as indicated in step 418, and the process then enters the USE ONCE state. If the use-once bit is not set in step 416, the instruction fetch data is returned from the instruction cache as indicated in step 420.

From the USE ONCE state, the process in step 422 removes the processor stall that was implemented in step 418, and proceeds to step 420 to return the instruction fetch data from the instruction cache.

From the MISS state, the process in step 424 determines if the instruction fetch data has been returned from the main memory. If the instruction fetch data has not been returned, the process remains in the MISS state. If the instruction fetch data has been returned, it is returned to the requesting processor in step 426, and the process returns to the IDLE state.

At least a portion of the operations described in conjunction with FIG. 4 can be implemented using the cache control logic 112 of FIG. 1. For example, the cache control logic 112 may be configured to clear the valid bit in step 418 based on the determination of the state of the use-once bit in step 416. As indicated previously, suitable arrangements of hardware, software or both for accomplishing these and other operations in the cache control logic 112 will be readily apparent to those skilled in the art.

It is also to be appreciated that the particular processing operations shown in FIG. 4 are by way of example only, and should not be construed as limitations of the invention. Those skilled in the art will recognize that the techniques of the invention can be implemented using other arrangements of processing operations.

FIG. 5 is a more particular example illustrating the operation of a three-processor implementation of the multiprocessor system 100 in accordance with the invention. The three processors are denoted P0, P1 and P2 for purposes of this example. The figure includes portions (a) through (g) which represent the changes in the state of the three-processor system 100 as software breakpoints are taken with the use-once mechanism described above. For each of the portions (a) through (g), the states of the three processors are shown. Each line indicates a different aspect of the state of the corresponding processor. The Pi state indicates whether the corresponding processor is in a debug state or a nondebug state. These states are also referred to as modes. The other states utilized in the figure are as follows:

Pi cache[ . . . ] V state indicates the state of the valid bit for a specific set in the cache for Pi.

Pi cache[ . . . ] U state indicates the state of the use-once bit for a specific set in the cache for Pi.

Pi cache[ . . . ] Tag state indicates the state of the tag part for a specific set in the cache for Pi.

Pi cache[ . . . ] Data state indicates the state of the data part for a specific set in the cache for Pi.

Pi cache[ . . . ] V state indicates the state of the valid bit for a specific set in the cache for Pi.

The expression index(x) denotes the index field 204 of the address of x. The expression cache[y] denotes the set of cache 210 addressed by y. The expression tag(z) indicates the tag field 202 of the address of z.

In (a) all three processors are executing operational code and are not in the debug mode.

In (b), P0 has fetched an instruction on which a software breakpoint has been set. The instruction on which the software breakpoint is set is indicated by swbpt. This instruction is stored in the cache in the set index(swbpt). After this instruction has been fetched into the cache, the valid bit V of this set is 1 and the use-once bit U of this set is 0. The tag 202 and data parts of this set are written with the tag part of the address and the actual data fetched from main memory 104. The data for this instruction is the DEBUG opcode.

In (c), P0 has executed the DEBUG opcode and entered its debug mode. The state of the cache set holding the DEBUG instruction is the same as in (b).

In (d), P0 is ready to exit its debug mode and resume normal operation. The debugger 302 has written the use-once bit to 1 and the data part of the cache set to the actual instruction that was replaced by a DEBUG opcode in main memory 104. Meanwhile, P2 has fetched the same instruction on which the software breakpoint is set. P2 fetches the instruction from main memory 104, which is still the DEBUG opcode, and writes it into its instruction cache, setting the valid bit, tag, and data parts of the corresponding cache set. This state illustrates how the use-once logic allows one processor to execute the actual instruction on which the software breakpoint is set without interfering with another processor hitting the breakpoint.

In (e), P0 has resumed normal operation. When P0 resumed, it addressed the cache with the address of swbpt. Since the V and U bits for this set are 1, the cache returned the bpopcode as the fetched instruction and cleared the V and U bits. P2 has executed the DEBUG opcode and entered debug mode.

In (f), P0 continues normal operation. P2 is ready to exit its debug mode and resume normal operation. The debugger 302 has written the use-once bit to 1 and the data part of the cache set to the actual instruction that was replaced by a DEBUG opcode in main memory 104.

In (g), P2 has resumed normal operation. When P2 resumed, it addressed the cache with the address of swbpt. Since the V and U bits for this set are 1, the cache returned the bpopcode as the fetched instruction and cleared the V and U bits. P0 is still executing normally.

The foregoing example is intended for purposes of illustration only, and should not be viewed as limiting the scope of the invention in any way.

Advantageously, the invention provides substantially improved software breakpoint capability in a multiprocessor system with little or no impact on processor cycle time, minimal hardware cost, and without requiring program alteration. Importantly, the action of clearing the valid bit in response to the set use-once bit does not take place during the lookup process where the index is used to find a set and compare the tags. Rather, the action of clearing the valid bit takes place after the hit determination is compete. In addition, there is no need for private local memory in each processor since the existing instruction cache memory is used. Furthermore, the executable code of a given user program can be used as is. There is no need to relocate it to private local memory so that the debug opcode can be managed.

It should also be noted that the invention makes the debugger more efficient when resuming from a breakpoint. With the invention, the debugger no longer has to perform the previously-described two-step process of "stepping" the actual instruction and then replacing the debug opcode. More particularly, the invention eliminates the latter of these two steps, which is a significant performance advantage for the debugger.

Although illustrated using an actual instruction cache, the invention can be implemented at least in part utilizing dedicated hardware which provides the functionality described above but does not otherwise serve as an actual instruction cache in normal operation of a multiprocessor system. In other words, the dedicated hardware is configured substantially as an instruction cache but is used only in implementing breakpoints in accordance with the techniques of the invention. The term "instruction cache" as used herein is intended to include this type of dedicated hardware.

The present invention may be configured to meet the requirements of a variety of different processing applications and environments, using any desired types and arrangements of processor, instruction cache, bus and main memory elements. The above-described embodiments of the invention are therefore intended to be illustrative only. For example, although the illustrative embodiment utilizes a single-bit use-once indicator for breakpointed instructions stored in an instruction cache, multiple-bit indicators can also be used, as can other arrangements of different types of single-bit or multiple-bit indicators. In addition, the particular manner in which the use-once indicator is updated may be altered. Furthermore, the breakpoint code, instruction, instruction address and cache set configurations may be varied as required to accommodate a given processing application or environment. These and numerous other alternative embodiments within the scope of the following claims will be apparent to those skilled in the art.

What is claimed is:

1. A method of implementing a software breakpoint in a multiprocessor system having a plurality of processors each coupled to a main memory, each of the processors having an instruction cache associated therewith, the method comprising the steps of:

retrieving an instruction, for which the breakpoint is to be inserted, from a corresponding instruction address in the main memory;

inserting a breakpoint code at the instruction address in main memory; and after the breakpoint code is executed by a given one of the processors, storing the retrieved instruction in the corresponding instruction cache for that processor and setting a use-once indicator associated with the instruction as stored in the corresponding instruction cache for that processor, wherein the use-once indicator, when set for the instruction as stored in the instruction cache, is operative via cache control logic to clear a validity indicator associated with the instruction after a single fetch of the instruction from the instruction cache, such that subsequent attempts by the given processor to access the instruction as stored in the instruction cache will cause the processor to retrieve the breakpoint code at the instruction address in main memory.

2. The method of claim 1 wherein the instruction cache includes a plurality of sets of instruction information, each corresponding to a particular instruction, a given one of the sets of instruction information comprising the validity indicator, the use-once indicator, an instruction tag, and instruction data.

3. The method of claim 1 wherein the instruction address comprises an instruction tag, an index and a block offset.

4. The method of claim 1 wherein the cache control logic is operative to compare portions of the instruction address to corresponding portions of instruction information as stored in the instruction cache and checks the validity indicator in determining if there is a hit or a miss between the instruction address and the instruction information as stored in the instruction cache.

5. The method of claim 1 wherein the use-once bit when set, being operative via the cache control logic to clear the validity indicator associated with the instruction as stored in the instruction cache after a single fetch of the instruction from the instruction cache, thereby automatically causes a miss between the instruction address and the instruction as stored in the instruction cache when the given processor attempts to retrieve the instruction from the instruction cache subsequent to the single fetch.

6. The method of claim 1 wherein the use-once indicator associated with the instruction comprises a single bit stored in a given set of the instruction cache.

7. The method of claim 1 wherein the validity indicator associated with the instruction comprises a single bit stored in a given set of the instruction cache.

8. The method of claim 1 wherein the instruction for which the breakpoint is to be inserted comprises an instruction having a noncacheable attribute associated therewith.

9. The method of claim 1 wherein at least a subset of the retrieving, inserting, storing and setting steps are implemented under the control of a debugger which interfaces with the multiprocessor system.

10. The method of claim 1 wherein the breakpoint code inserted at the instruction address in main memory comprises a debug opcode.

11. A multiprocessor system comprising:

a main memory; and a plurality of processors each coupled to the main memory, each of the processors having an instruction cache associated therewith;

wherein an instruction, for which the breakpoint is to be inserted, is retrievable from a corresponding instruction address in the main memory;

wherein a breakpoint code is insertable at the instruction address in main memory; and wherein subsequent to execution of the breakpoint code by the given processor, the retrieved instruction is stored in the corresponding instruction cache for that processor, and a use-once indicator associated with the instruction as stored in the corresponding instruction cache for that processor is set, wherein the use-once indicator, when set for the instruction as stored in the instruction cache, is operative via cache control logic to clear a validity indicator associated with the instruction after a single fetch of the instruction from the instruction cache, such that subsequent attempts by the given processor to access the instruction as stored in the instruction cache will cause the processor to retrieve the breakpoint code at the instruction address in main memory.

12. An article of manufacture comprising a machine-readable storage medium for storing one or more software programs for implementing a software breakpoint in a multiprocessor system having a plurality of processors each coupled to a main memory, each of the processors having an instruction cache associated therewith, wherein the one or more software programs when executed implement the steps of:

retrieving an instruction, for which the breakpoint is to be inserted, from a corresponding instruction address in the main memory;

inserting a breakpoint code at the instruction address in main memory; and after the breakpoint code is executed by a given one of the processors, storing the retrieved instruction in the corresponding instruction cache for that processor and setting a use-once indicator associated with the instruction as stored in the corresponding instruction cache for that processor, wherein the use-once indicator, when set for the instruction as stored in the instruction cache, is operative via cache control logic to clear a validity indicator associated with the instruction after a single fetch of the instruction from the instruction cache, such that subsequent attempts by the given processor to access the instruction as stored in the instruction cache will cause the processor to retrieve the breakpoint code at the instruction address in main memory.

* * * * *